United States Patent
Eo et al.

(10) Patent No.: US 10,605,336 B2
(45) Date of Patent: Mar. 31, 2020

(54) TRANSMISSION FOR VEHICLE

(71) Applicant: HYUNDAI MOTOR COMPANY, Seoul (KR)

(72) Inventors: Soon Ki Eo, Ansan-si (KR); Woo Churl Son, Seongnam-si (KR); Chae Hong Lim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 440 days.

(21) Appl. No.: 15/599,036

(22) Filed: May 18, 2017

(65) Prior Publication Data

US 2018/0149239 A1    May 31, 2018

(30) Foreign Application Priority Data

Nov. 29, 2016    (KR) .......................... 10-2016-0160145

(51) Int. Cl.
*F16H 3/00*      (2006.01)
*F16H 3/093*     (2006.01)

(52) U.S. Cl.
CPC ............. *F16H 3/093* (2013.01); *F16H 3/006* (2013.01); *F16H 2200/0047* (2013.01)

(58) Field of Classification Search
CPC . F16H 3/093; F16H 3/006; F16H 3/10; F16H 37/043; F16H 2003/007
USPC .................................. 74/330, 331, 333, 340
See application file for complete search history.

(56) References Cited

U.S. PATENT DOCUMENTS

| | | | |
|---|---|---|---|
| 8,104,366 B2* | 1/2012 | Remmler ................ | F16H 3/006 74/330 |
| 8,156,836 B2* | 4/2012 | Remmler ................ | F16H 3/006 74/330 |
| 8,622,862 B2* | 1/2014 | Koyama .................. | B60K 6/36 475/5 |
| 8,887,588 B2* | 11/2014 | Koyama ............... | B60W 10/02 74/329 |
| 2007/0266810 A1* | 11/2007 | Forsyth .................. | F16H 3/006 74/331 |
| 2008/0034905 A1* | 2/2008 | Hatori .................... | F16H 3/006 74/330 |
| 2011/0061493 A1* | 3/2011 | Bartling ................. | F16H 3/006 74/665 D |

(Continued)

FOREIGN PATENT DOCUMENTS

KR    10-2008-0033700    4/2008

*Primary Examiner* — Ha Dinh Ho
(74) *Attorney, Agent, or Firm* — Brinks Gilson & Lione

(57) ABSTRACT

A transmission for a vehicle is provided to reduce a full length and a weight of the transmission. The transmission includes: first and second input shafts, output and transfer shafts disposed in parallel with the first and second input shafts; a transfer idler shaft to reduce rotational power transmitted to the transfer shaft and transfer the reduced rotational power to the output shaft via a gear structure; and a shaft gear apparatus. The shift gear apparatus selects a gear pair suitable for a traveling speed by a synchronizer by meshing gear pairs with: the first input shaft and the output shaft, the second input shaft and the output shaft, and the first input shaft and the transfer shaft. In particular, the gear pairs include a gear pair to form a lowermost stage, a gear pair forming an upper most stage, and a gear pair for forming a reverse stage.

5 Claims, 6 Drawing Sheets

(56) References Cited

U.S. PATENT DOCUMENTS

2011/0214533 A1* 9/2011 Koyama ............... B60W 10/02
74/665 A

* cited by examiner

FIG. 6

| SHIFT STAGE | CL1 | CL2 | S1 1STAGE | S1 N | S1 3STAGE | S2 2STAGE | S2 N | S2 5STAGE | S3 R STAGE | S3 N | S3 4STAGE |
|---|---|---|---|---|---|---|---|---|---|---|---|
| R |   | ○ | ○ |   |   |   | ○ |   |   |   |   |
| N |   |   | ○ |   |   |   | ○ |   |   |   |   |
| 1 | ○ |   | ○ |   |   |   |   |   |   |   |   |
| 2 | ○ | ○ |   |   | ○ | ○ |   |   |   |   |   |
| 3 | ○ |   |   |   | ○ | ○ |   |   |   |   |   |
| 4 |   | ○ |   | ○ |   |   |   |   | ○ |   | ○ |
| 5 | ○ |   |   | ○ |   |   |   | ○ |   |   | ○ |

US 10,605,336 B2

TRANSMISSION FOR VEHICLE

CROSS REFERENCE TO RELATED APPLICATION

The present application claims priority to and the benefit of Korean Patent Application No. 10-2016-0160145, filed on Nov. 29, 2016, the entire contents of which is incorporated herein by reference.

FIELD

The present disclosure relates to a transmission for a vehicle.

BACKGROUND

The statements in this section merely provide background information related to the present disclosure and may not constitute prior art.

An automated manual transmission based on a synchromesh type manual transmission mechanism is automatically shifted by an actuator during driving of a vehicle to be able to provide driving convenience similar to that of an automatic transmission and transmit power more efficiently than the automatic transmission, contributing to improvement in fuel efficiency of a vehicle.

In particular, the DCT may perform a shift by a handover control for cross-controlling two clutches during a shift of a gear, thereby improving a shift feeling by reducing phenomenon caused by cutting off power to an engine.

However, since the DCT uses the existing manual transmission structure, an inter-shaft distance (distance between an input shaft and an output shaft) of the transmission may increase due to a configuration of a first gear ratio having a large reduction ratio and it may be difficult to reduce a weight of a gear train due to a distance between the input shaft and a differential shaft.

The contents described as the related art have been provided only for assisting in the understanding for the background of the present disclosure and should not be considered as prior art known to those skilled in the art.

SUMMARY

The present disclosure provides a transmission for a vehicle having reduced length and weight of the transmission by improving a disposition structure of gears for forming each shift gear.

According to an exemplary form of the present disclosure, there is provided a transmission for a vehicle, including: a first input shaft and a second input shaft configured to be selectively supplied with rotational power of a driving source by a first clutch and a second clutch; an output shaft and a transfer shaft configured to be disposed in parallel with the first input shaft and the second input shaft; a transfer idler shaft configured to reduce the rotational power transmitted to the transfer shaft and configured to transfer the reduced rotational power to the output shaft via a geared structure; and a shift gear apparatus configured to mesh a plurality of gear pairs having different gear ratios with: the first input shaft and the output shaft, the second input shaft and the output shaft, and the first input shaft and the transfer shaft, and configured to select a gear pair of the plurality of gear pairs suitable for a traveling speed by a synchronizer. In particular, among the plurality of gear pairs, a gear pair for forming a lowermost stage, a gear pair for forming an uppermost stage, and a gear pair for forming a reverse stage are configured to be selected by different synchronizers and the gear pair for forming the lowermost stage is meshed with the first input shaft and the transfer shaft.

The transfer shaft may be disposed in parallel with the transfer idler shaft, a first transfer gear pair may be meshed with the transfer shaft and the transfer idler shaft, and a second transfer gear pair may be meshed with the transfer idler shaft and the output shaft.

The first input shaft may be formed in a hollow shape so that the second input shaft is inserted into the first input shaft, the gear pair for forming the uppermost stage may be meshed with the first input shaft and the output shaft, and the gear pair for forming the reverse stage may be meshed with the second input shaft and the output shaft.

A first synchronizer may be provided on the transfer shaft to select a 1-stage gear pair for forming the lowermost stage and a 3-stage gear pair, a second synchronizer may be provided on the output shaft to select a 5-stage gear pair for forming the uppermost stage and a 2-stage gear pair, and a third synchronizer may be provided on the output shaft to select an R-stage gear pair for forming the reverse stage and a 4-stage gear pair.

The 1-stage gear pair and the 3-stage gear pair may be meshed with the first input shaft and the transfer shaft, respectively, the 2-stage gear pair, the 4-stage gear pair, and the R-stage gear pair may be each meshed with the second input shaft and the output shaft, and the 5-stage gear pair may be meshed with the first input shaft and the output shaft.

The 3-stage gear pair and the 5-stage gear pair may share an input gear provided on the first input shaft.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6 is a diagram illustrating a shift operation table of a transmission according to an exemplary form of the present disclosure.

Figure 1:
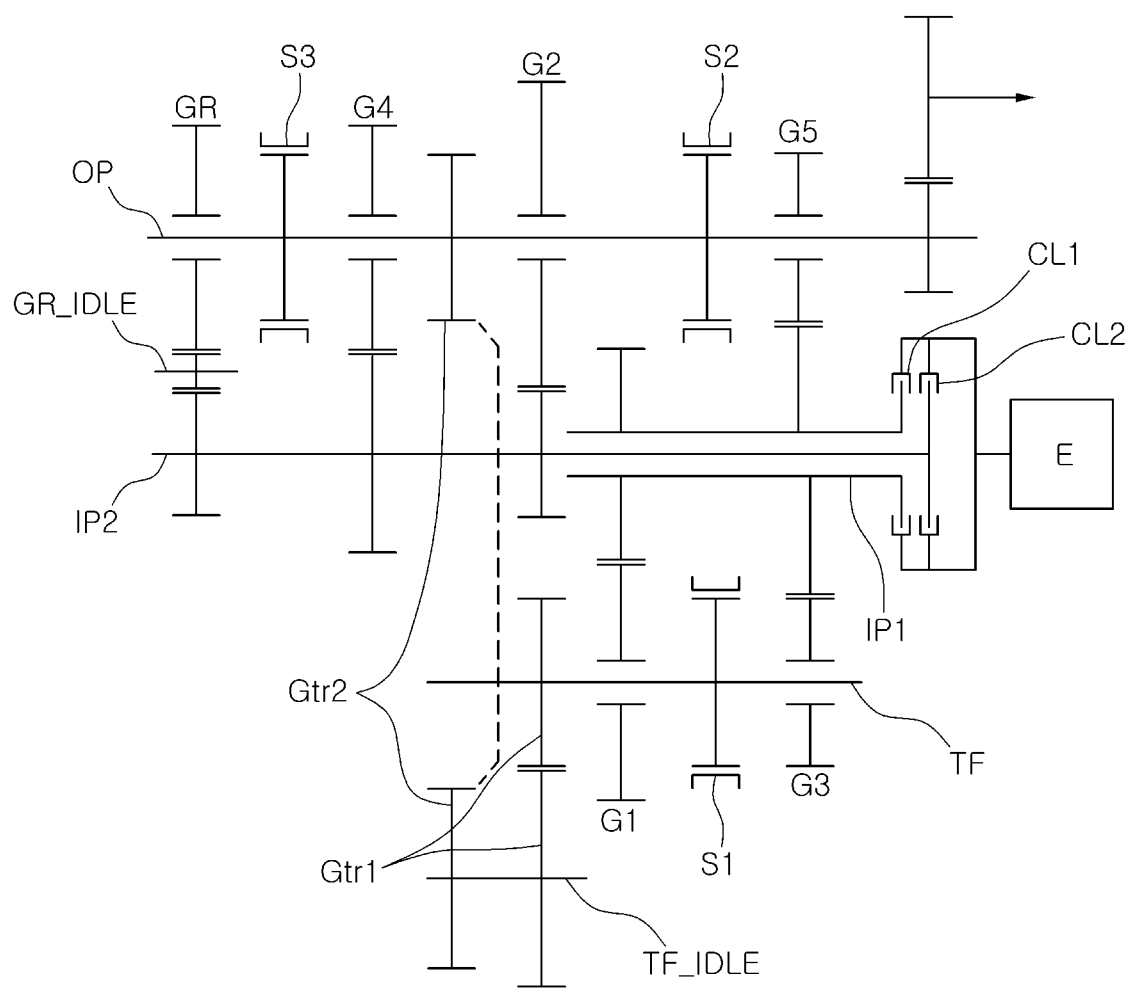
FIG. 1 is a diagram illustrating a layout of a forward 5-speed transmission according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure will be described in detail with reference to the accompanying drawings.

A transmission for a vehicle according to an exemplary form of the present disclosure may include a first input shaft IP1 and a second input shaft IP2, a transfer shaft TF, a transfer idler shaft TF_IDLE, and a transmission gear apparatus.

Figure 2:
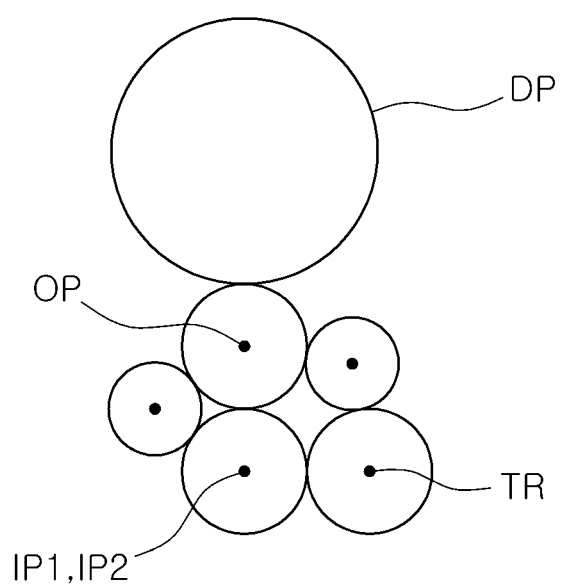
FIG. 2 is a diagram illustrating an inter-shaft distance of a transmission according to an exemplary form of the present disclosure.

With reference to FIGS. 1 and 2, the first input shaft IP1 may rotate by being selectively supplied with rotational power of a driving source by a first clutch CL1, in which the first clutch CL1 may be installed between an end of the first input shaft IP1 and an engine E.

Further, the second input shaft IP2 may rotate by being selectively supplied with the rotational power of the driving source by the second clutch CL2, in which the second clutch CL2 may be installed between the end of the second input shaft IP2 and the engine E.

An output shaft OP is disposed in parallel with the first input shaft IP1 and the second input shaft IP2 at one side and a transfer shaft TF is disposed in parallel with the first input shaft IP1 and the second input shaft IP2 at the other side.

In addition, the transfer idler shaft TF_IDLE may be configured to reduce the rotational power transmitted to the transfer shaft TF and transmit the reduced rotational power to the output shaft OP via a geared structure.

That is, a gear is meshed with the transfer shaft TF and the transfer idler shaft TF_IDLE. Another gear is meshed with the transfer idler shaft TF_IDLE and the output shaft OP to reduce the rotational power of the engine E transmitted to the transfer shaft TF and transmit the reduced rotational power to the output shaft OP.

For example, the transfer shaft TF and the transfer idler shaft TF_IDLE may be arranged in parallel, and a first transfer gear pair Gtr1 may be meshed with the transfer shaft TF and the transfer idler shaft TF_IDLE. And a second transfer gear pair Gtr2 may be meshed with the transfer idler shaft TF_IDLE and the output shaft OP.

At this point, the first transfer gear pair Gtr1 and the second transfer gear pair Gtr2 may be provided on each shaft in a state in which a rotation thereof is restricted.

The transmission gear apparatus includes a plurality of gear pairs having different gear ratios that are meshed with the first input shaft IP1 and the output shaft OP, the second input shaft IP2 and the output shaft OP, and the first input shaft IP1 and the transfer shaft TF, respectively and may be configured to select a gear pair suitable for a traveling speed by a synchronizer.

At this point, among the gear pairs configured in the transmission gear apparatus, a gear pair for forming a lowermost stage, a gear pair for forming an uppermost stage, and a gear pair for forming a reverse stage may be configured to be selected by different synchronizers.

For example, the transmission may be a transmission capable of implementing forward 5 stages and a reverse 1 stage, and a 1-stage gear pair G1 that is a gear pair for forming the lowermost stage, a 5-stage gear pair G5 for forming an uppermost stage, and an R-stage gear pair GR for forming a reverse stage may be selected by different synchronizers.

In particular, the gear pair for forming the lowermost stage may be meshed with the first input shaft IP1 and the transfer shaft TF.

That is, an input gear of the first gear pair G1 may be provided on the first input shaft IP1 and an output gear of the 1-stage gear pair G1 may be provided on the transfer shaft TF.

According to the above configuration, the 1-stage gear pair G1 is meshed with the first input shaft IP1 and the transfer shaft TF. Gears for deceleration are each meshed with the transfer shaft TF, the transfer idler shaft TF_IDLE, and the output shaft OP, such that the 1-stage gear ratio having the largest reduction ratio may be implemented by combining the gear ratios of the reduction gears connected from the 1-stage gear pair G1 to the output shaft OP.

Accordingly, the distance between the input shaft and the output shaft OP is reduced, and as a result the miniaturization and weight reduction of the transmission may be achieved.

In addition, in another form, the first input shaft IP1 is formed in a hollow shape, and thus a part of the second input shaft IP2 may be inserted into the first input shaft IP1.

Further, the gear pair for forming the uppermost stage may be meshed with the first input shaft IP1 and the output shaft OP, and the gear pair for forming the reverse stage may be meshed with the second input shaft IP2 and the output shaft OP.

For example, an input gear and an output gear of the 5-stage gear pair G5 for forming the uppermost stage may be meshes with the first input shaft IP1 and the output shaft OP, and an input gear and an output gear of the R-stage gear pair GR for forming the reverse stage may be meshed with the second input shaft IP2 and the output shaft OP.

At this point, a reverse idler gear GR_IDLE is provided between the input gear and the output gear of the R-stage gear pair GR so that the R-stage input gear is meshed with the reverse idler gear GR_IDLE and the reverse idler gear GR_IDLE may be meshed with an R-stage output gear.

In one form, a gear power transmission path at a high speed is formed as short as possible in terms of power transmission efficiency, and therefore the 5-stage gear pair G5 is provided on the first input shaft IP1 and the output shaft OP.

Further, the reverse stage further includes a reverse idler gear GR_IDLE for changing a rotation direction of the engine E, and thus the reverse idler gear GR_IDLE may be more provided on the second input shaft IP2 that is a solid shaft rather than on the first input shaft IP1 that is a hollow shaft in terms of the gear design for the purpose of the weight reduction, such that the R-stage gear pair GR is provided on the second input shaft IP2 and the output shaft OP.

In addition, in one form of the present disclosure, the transfer shaft may be provided with the 1-stage gear pair G1 for forming the lowermost stage and a first synchronizer S1 for selecting a 3-stage gear pair G3.

In addition, the output shaft OP may be provided with the 5-stage gear pair G5 for forming the uppermost stage and a second synchronizer S2 for selecting a 2-stage gear pair G2.

In addition, the output shaft OP may be provided with the R-stage gear pair GR for forming the reverse stage and a third synchronizer S3 for selecting a 4-stage gear pair G4.

For example, the first synchronizer S1 may be provided between the output gear of the 1-stage gear pair G1 and the output gear of the 3-stage gear pair G3, the second synchronizer S2 may be provided between the output gear of the 5-stage gear pair G5 and the output gear of the 2-stage gear pair G2. The third synchronizer S3 may be provided between the output gear of the R-stage gear pair GR and the output gear of the 4-stage gear pair G4.

Accordingly, the 1-stage gear pair G1 and the 3-stage gear pair G3 may be meshed with the first input shaft IP1 and the transfer shaft TF, respectively.

Further, the 2-stage gear pair G2, the 4-stage gear pair G4, and the R-stage gear pair GR may be meshed with the second input shaft IP2 and the output shaft OP, respectively.

Further, the 5-stage gear pair G5 may be meshed with the first input shaft IP1 and the output shaft OP.

In particular, the 3-stage gear pair G3 and the 5-stage gear pair G5 may be configured to share the input gear provided on the first input shaft IP1.

That is, a 1-stage shift stage and a 3-stage shift stage are implemented through the transfer shaft TF and the transfer idler shaft TF_IDLE disposed in parallel with the output shaft OP so that the number of gears provided on the output shaft OP is reduced and the gear pair for forming some of the shift stages is configured to share the input gear, thereby reducing the full length of the transmission and improving the mountability of the transmission in the vehicle.

The configuration of the layout of the transmission with the structure of the gears, as a 5-speed transmission, may provide combinations of the shift stages that may be selected according to the operation of the synchronizer. The combinations may be 14 combinations: 1-2, 1-3, 1-4, 1-5, 1-R, 2-3, 2-4, 2-5, 2-R, 3-4, 3-5, 3-R, 4-5, and 4-R.

However, in the case of the DCT, a shift stage having a 1-step difference from one shift stage of the synchronizer may not come to the other side, and therefore the combinations of 1-2, 2-3, 3-4 and 4-5 are removed.

Further, the 1-stage and the R-stage are not selected by the same synchronizer due to the characteristics of the shift, and therefore the combination of 1-R is also removed.

Therefore, as the remaining combinations, there are a total of nine combinations of 1-3, 1-4, 1-5, 2-4, 2-5, 2-R, 3-5, 3-R, and 4-R.

Here, in the case of a 5-speed transmission, considering the gear stage in which the input gear may be commonly used to reduce the number of gears and the full length in consideration of the gear ratio, or the like, the 3 stage and the 5 stage may be considered, but the 3 stage and the 5 stage do not use the same synchronizer, and therefore the number of combinations that can use the 3 stage and the synchronizer together becomes two (i.e., 3-1 and 3-R).

Considering the combination of the third stage and the R stage among the combinations, the R stage may be disposed on the input shaft formed as the solid shaft in consideration of the R-stage disposition. Here, if the output gears of the 3 stage and the R stage are provided on the output shaft OP in consideration of the R stage, the output gear of the 5 stage is connected to the transfer shaft TF, and thus the shift stage is configured by combinations of several gears.

However, if the 5 stage is formed by the combinations of several gears as described above, the transmission efficiency of the 5 stage rotating at a high speed becomes excessively poor, and thus the reduction in fuel efficiency may arise.

Therefore, the 3 stage and the R stage should not be combined so as to be selected by the same synchronizer and the 1 stage should be shifted while being combined with other gears through the transfer shaft TF to reduce the inter-shaft distance, and therefore should not be meshed with the second input shaft IP2 that is the solid shaft.

Therefore, arranging the combinable shift stages that may be selected by the synchronizer, a total of 5 combinations of 1-3, 2-4, 2-5, 2-R, and 4-R remain. Among those, as a combination including 5 stage, only a 2-5 combination remains.

Therefore, finally, the combinations of 1-3, 2-5, and 4-R remain. As illustrated in FIG. 1, the 1-stage and 3-stage shift stages are provided on the first input shaft IP1 that is the hollow shaft and the transfer shaft TF and are configured to be selected by the first synchronizer S1 and the 2-stage and 5-stage shift stages are configured to be selected by the second synchronizer S2, in which the 5 stage may be meshed with the output shaft OP while sharing the input gear with the 3 stage and the 2 stage may be configured to be meshed with the second input shaft IP2.

Further, the 4-stage and R-stage shift stages may be provided on the second input shaft IP2 that is the solid shaft and the output shaft OP and configured to be selected by the third synchronizer S3.

However, in FIG. 1, the gears disposed in order of R-4 may be disposed in an order of 4-R, and when the gears are disposed in order of 4-R, the R-stage gear may also be configured in a manner of a combined gear like the 1-stage shift stage.

Hereinafter, a power transmission flow at some of the shift stages using the transmission according to the exemplary form of the present disclosure will be described.

Figure 3:
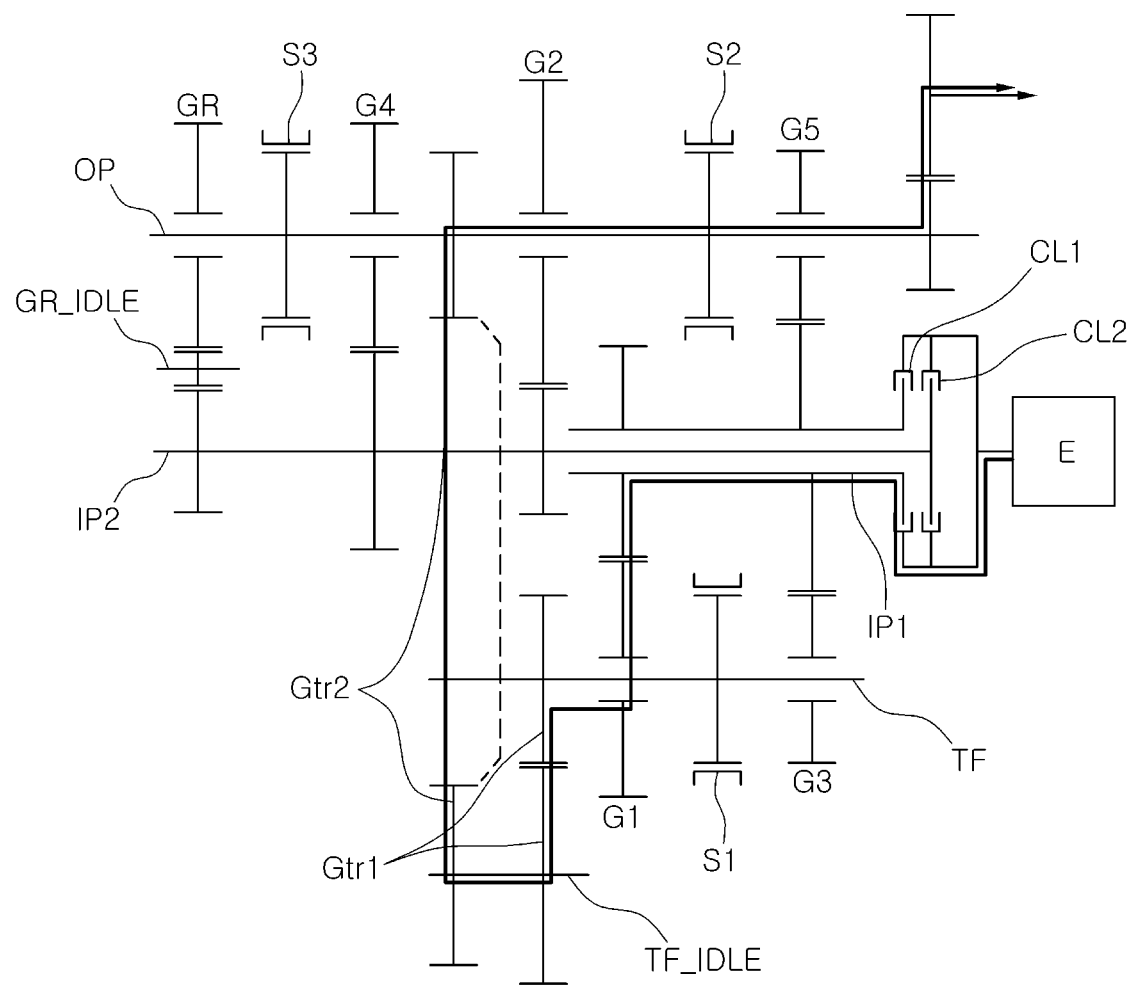
FIG. 3 is a diagram illustrating a power transfer path at the time of a formation of a 1 stage.

Referring to FIGS. 3 and 6, the 1-stage gear pair G1 is selected by the first synchronizer S1 for forming the 1 stage, and then a first clutch CL1 is engaged.

Then, the rotational power of the engine E is transmitted to the transfer shaft TF over the 1-stage gear pair G1 along the first input shaft IP1 and transmitted to the output shaft OP over the first transfer gear pair Gtr1 and the second transfer gear pair Gtr2 that are meshed with the transfer shaft TF, the transfer idler shaft TF_IDLE, and the output shaft OP.

Therefore, the rotational power transmitted to the output shaft OP is transmitted to the drive wheels through a differential DP to drive the vehicle in the 1 stage.

Figure 4:
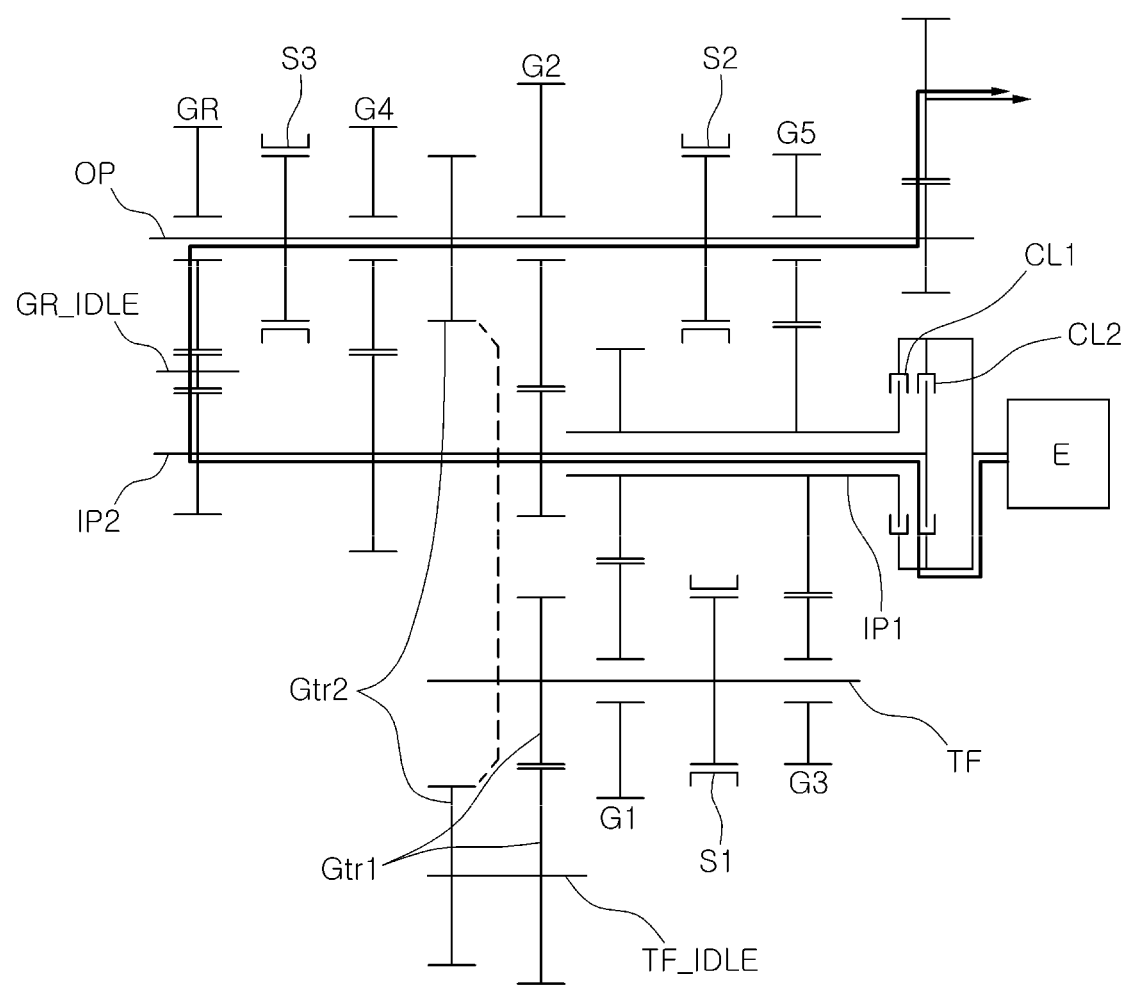
FIG. 4 is a diagram illustrating a power transfer path at the time of a formation of a 2 stage.

Referring to FIGS. 4 and 6, the 2-stage gear pair G2 is selected by the second synchronizer S2 for forming the 2 stage, and then a second clutch CL2 is engaged.

Then, the rotational power of the engine E is transmitted to the output shaft OP over the 2-stage gear pair G2 along the second input shaft IP2. Therefore, the rotational power transmitted to the output shaft OP is transmitted to the drive wheels through the differential to drive the vehicle in the 2 stage.

Figure 5:
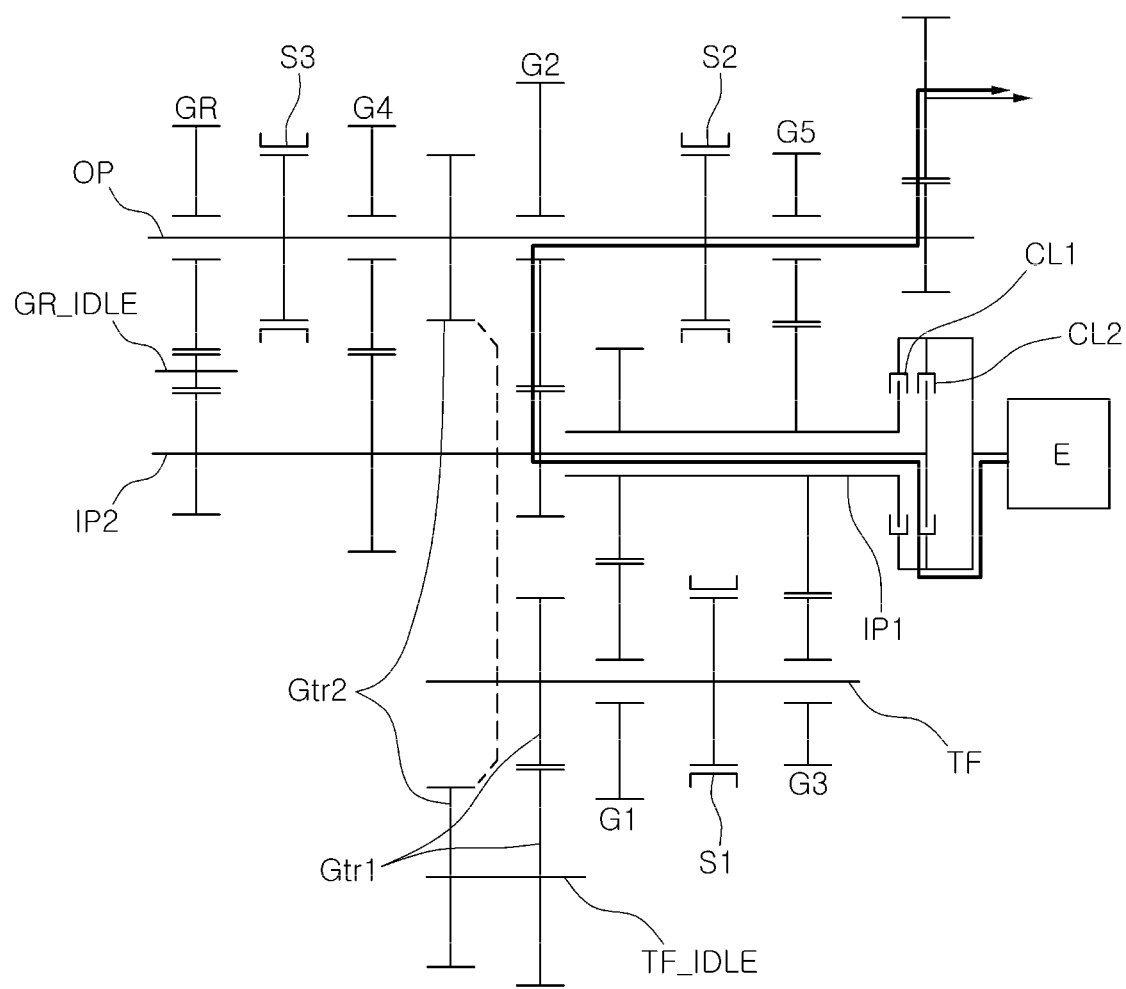
FIG. 5 is a diagram illustrating a power transfer path at the time of a formation of an R stage.

Referring to FIGS. 5 and 6, the R stage gear pair GR is selected by the third synchronizer S3 for forming the R stage, and then the second clutch CL2 is engaged.

Then, the rotational power of the engine E is transmitted to the output shaft OP over the R-stage gear pair GR and the reverse idler gear GR_IDLE along the second input shaft IP2. Therefore, the rotational power transmitted to the output shaft OP is transmitted to the drive wheels through the differential to drive the vehicle in the R stage.

By the configuration, according to the exemplary form of the present disclosure, the 1-stage gear ratio having the largest reduction ratio may be implemented by combining the gear ratios of the reduction gears connected from the gear pair of the lowermost stage to the output shaft to reduce the inter-shaft distance between the input shaft and the output shaft, thereby achieving the miniaturization and the weight reduction of the transmission. Some of the shift gears including the shift gear of the lowermost stage may be implemented by the transfer shaft and the transfer idler shaft disposed in parallel with the output shaft to reduce the number of gears equipped on the output shaft, thereby reducing the full length of the transmission, and enhancing the mountability of the transmission in the vehicle.

Meanwhile, although specific examples of the present disclosure have been described above in detail, it is obvious to those skilled in the art that various modifications and alterations may be made without departing from the spirit and scope of the present disclosure.

What is claimed is:

1. A transmission for a vehicle, comprising:
a first input shaft and a second input shaft configured to be selectively supplied with rotational power of a driving source by a first clutch and a second clutch;
an output shaft and a transfer shaft configured to be disposed in parallel with the first input shaft and the second input shaft;
a transfer idler shaft configured to reduce the rotational power transmitted to the transfer shaft and configured to transfer the reduced rotational power to the output shaft via a geared structure; and
a shift gear apparatus configured to mesh a plurality of gear pairs having different gear ratios with the first input shaft and the output shaft, the second input shaft and the output shaft, and the first input shaft and the transfer shaft, and configured to select a gear pair of the plurality of gear pairs suitable for a traveling speed by a synchronizer,
wherein:
among the plurality of gear pairs, a gear pair for forming a lowermost stage, a gear pair for forming an uppermost stage, and a gear pair for forming a reverse stage are configured to be selected by different synchronizers,
the gear pair for forming the lowermost stage is meshed with the first input shaft and the transfer shaft,
the first input shaft is formed in a hollow shape so that the second input shaft is inserted into the first input shaft,
the gear pair for forming the uppermost stage is meshed with the first input shaft and the output shaft, and
the gear pair for forming the reverse stage is meshed with the second input shaft and the output shaft.

2. The transmission for a vehicle of claim 1, wherein the transfer shaft is disposed in parallel with the transfer idler shaft,
a first transfer gear pair is meshed with the transfer shaft and the transfer idler shaft, and
a second transfer gear pair is meshed with the transfer idler shaft and the output shaft.

3. A transmission for a vehicle, comprising:
a first input shaft and a second input shaft configured to be selectively supplied with rotational power of a driving source by a first clutch and a second clutch;
an output shaft and a transfer shaft configured to be disposed in parallel with the first input shaft and the second input shaft;
a transfer idler shaft configured to reduce the rotational power transmitted to the transfer shaft and configured to transfer the reduced rotational power to the output shaft via a geared structure; and
a shift gear apparatus configured to mesh a plurality of gear pairs having different gear ratios with the first input shaft and the output shaft, the second input shaft and the output shaft, and the first input shaft and the transfer shaft, and configured to select a gear pair of the plurality of gear pairs suitable for a traveling speed by a synchronizer,
wherein, among the plurality of gear pairs, a gear pair for forming a lowermost stage, a gear pair for forming an uppermost stage, and a gear pair for forming a reverse stage are configured to be selected by different synchronizers, and
the gear pair for forming the lowermost stage is meshed with the first input shaft and the transfer shaft, and
wherein a first synchronizer is provided on the transfer shaft to select a 1-stage gear pair for forming the lowermost stage and a 3-stage gear pair,
a second synchronizer is provided on the output shaft to select a 5-stage gear pair for forming the uppermost stage and a 2-stage gear pair, and
a third synchronizer is provided on the output shaft to select an R-stage gear pair for forming the reverse stage and a 4-stage gear pair.

4. The transmission for a vehicle of claim 3, wherein the 1-stage gear pair and the 3-stage gear pair are meshed with the first input shaft and the transfer shaft, respectively,
the 2-stage gear pair, the 4-stage gear pair, and the R-stage gear pair are each meshed with the second input shaft and the output shaft, and
the 5-stage gear pair is meshed with the first input shaft and the output shaft.

5. The transmission for a vehicle of claim 4, wherein the 3-stage gear pair and the 5-stage gear pair share an input gear provided on the first input shaft.

* * * * *